No. 674,547. Patented May 21, 1901.
W. W. WILLSON.
CHAIN COUPLING MACHINE.
(Application filed May 24, 1895.)
(No Model.) 5 Sheets—Sheet 1.

No. 674,547. Patented May 21, 1901.
W. W. WILLSON.
CHAIN COUPLING MACHINE.
(Application filed May 24, 1895.)
(No Model.) 5 Sheets—Sheet 2.

WITNESSES
Wm H Edwards
Howard W. Orr

INVENTOR
William W. Willson
By H. H. Bliss
Atty.

No. 674,547. Patented May 21, 1901.
W. W. WILLSON.
CHAIN COUPLING MACHINE.
(Application filed May 24, 1895.)
(No Model.) 5 Sheets—Sheet 3.
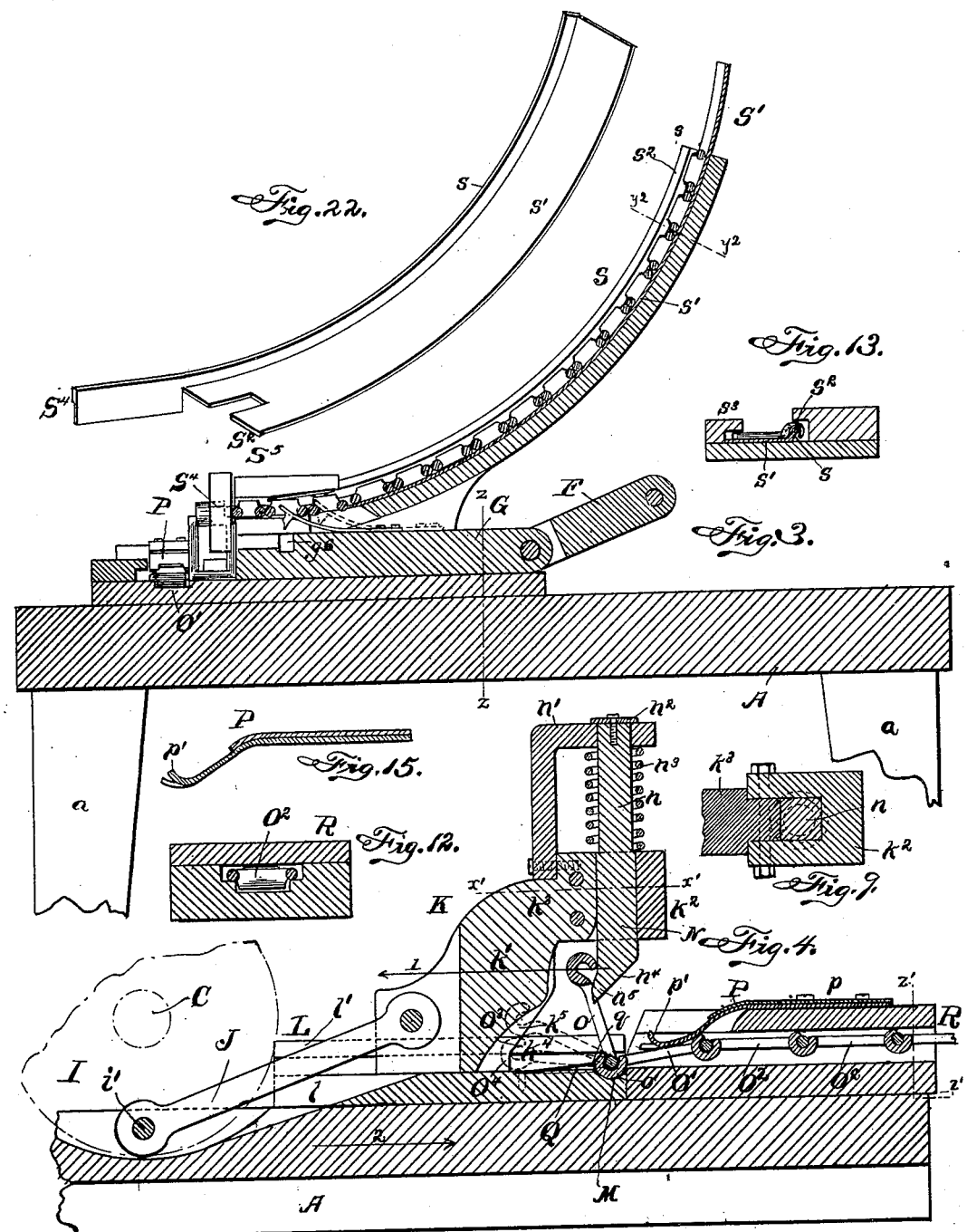

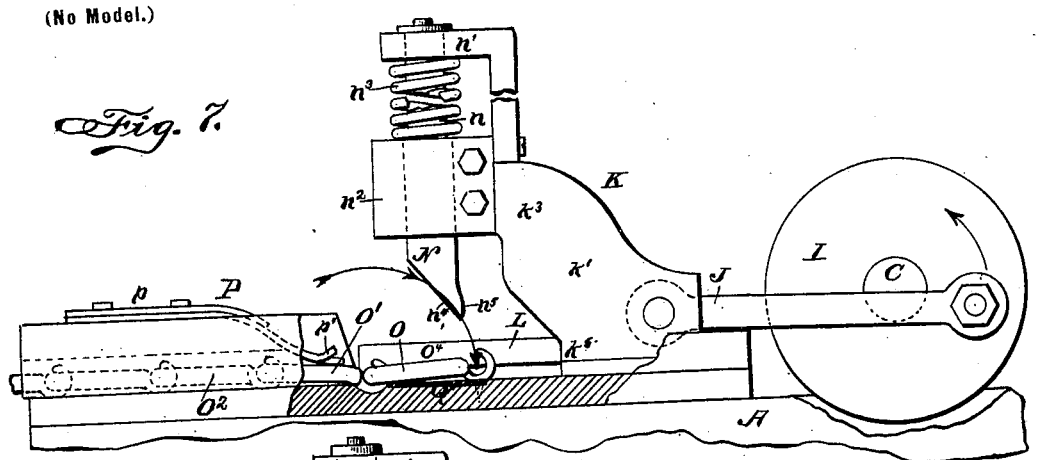
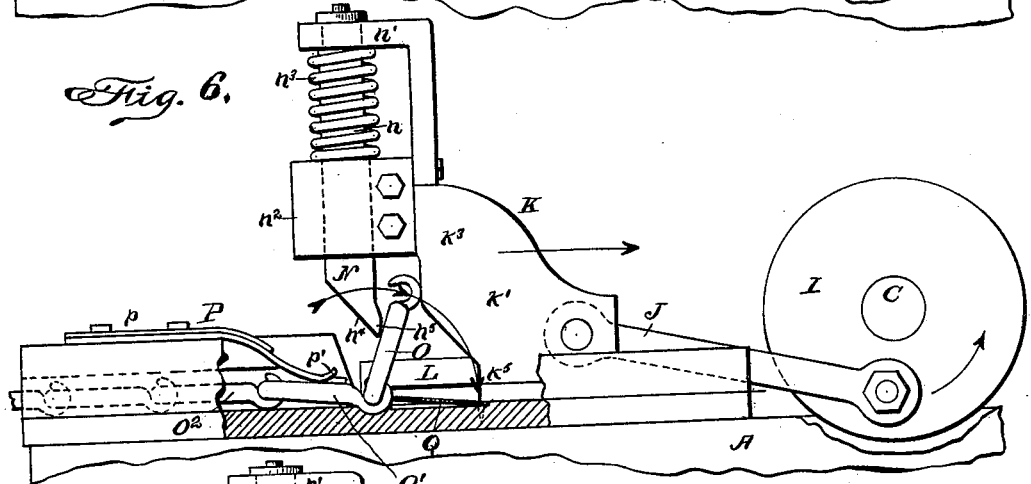
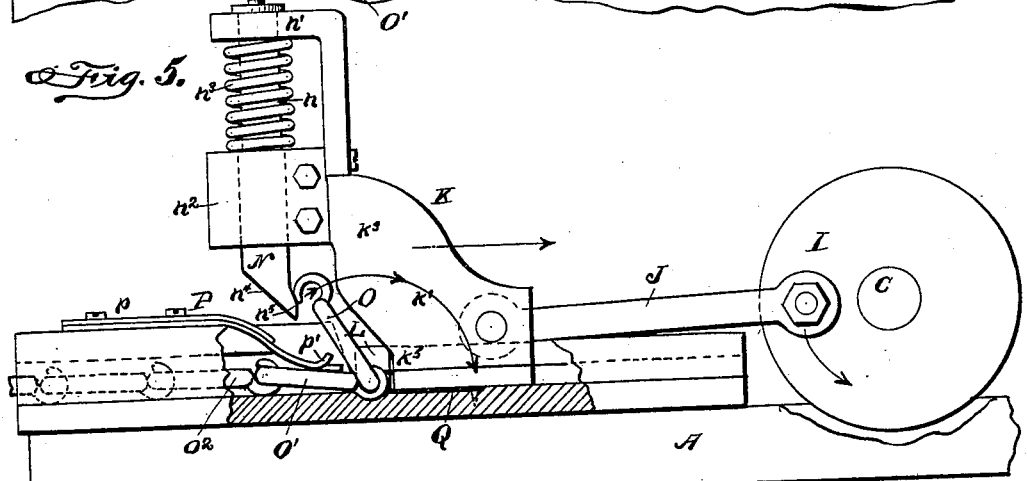

No. 674,547. Patented May 21, 1901.
W. W. WILLSON.
CHAIN COUPLING MACHINE.
(Application filed May 24, 1895.)
(No Model.) 5 Sheets—Sheet 5.
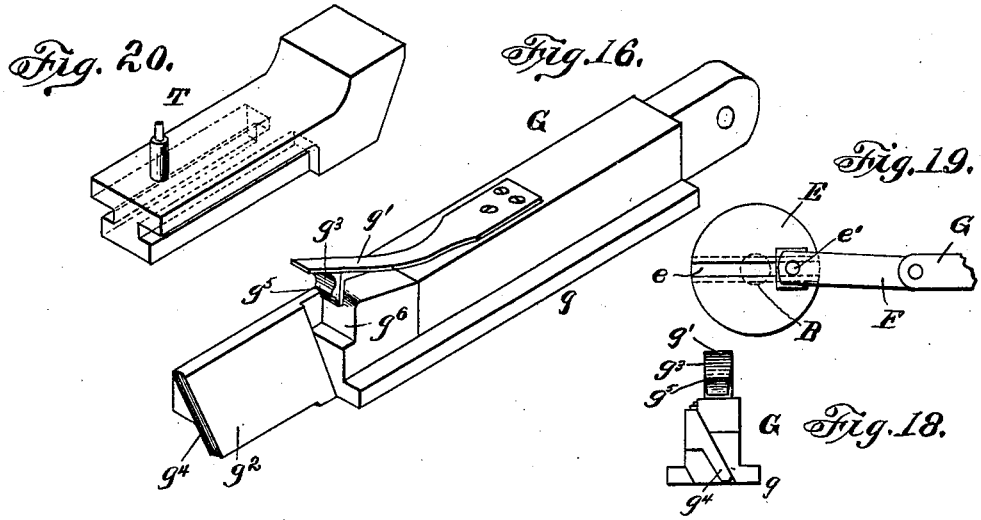
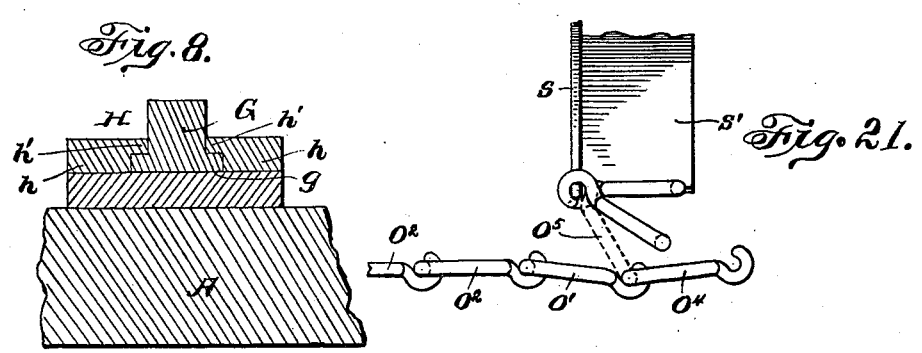

UNITED STATES PATENT OFFICE.

WILLIAM W. WILLSON, OF COLUMBUS, OHIO, ASSIGNOR TO JOSEPH A. JEFFREY, OF SAME PLACE.

CHAIN-COUPLING MACHINE.

SPECIFICATION forming part of Letters Patent No. 674,547, dated May 21, 1901.

Application filed May 24, 1895. Serial No. 550,575. (No model.)

*To all whom it may concern:*

Be it known that I, WILLIAM W. WILLSON, a citizen of the United States, residing at Columbus, in the county of Franklin and State of Ohio, have invented certain new and useful Improvements in Chain-Coupling Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in machines for automatically coupling chain-links, and more particularly to improvements in machines adapted to couple together links of any of the various forms having a hook at one end and a bar at the other end adapted to move into and out from the hook of an adjacent link when two of the links are in an unusual position relative to each other.

The object of the invention is to provide a mechanism by which not only the lateral movement of one link relative to the next shall be accomplished by a positive movement, but also the swinging or rocking of the newly-inserted link into its working position shall be effected by a positively-moving part of the mechanism, the latter being in contradistinction to the machines heretofore used, which have been so constructed as to effect this rocking or swinging of the link last inserted by means of a stationary plate or bar in the path of the link and acting to turn it upon its pintle-axis when the chain has a forward draft exerted on it.

Figure 1:
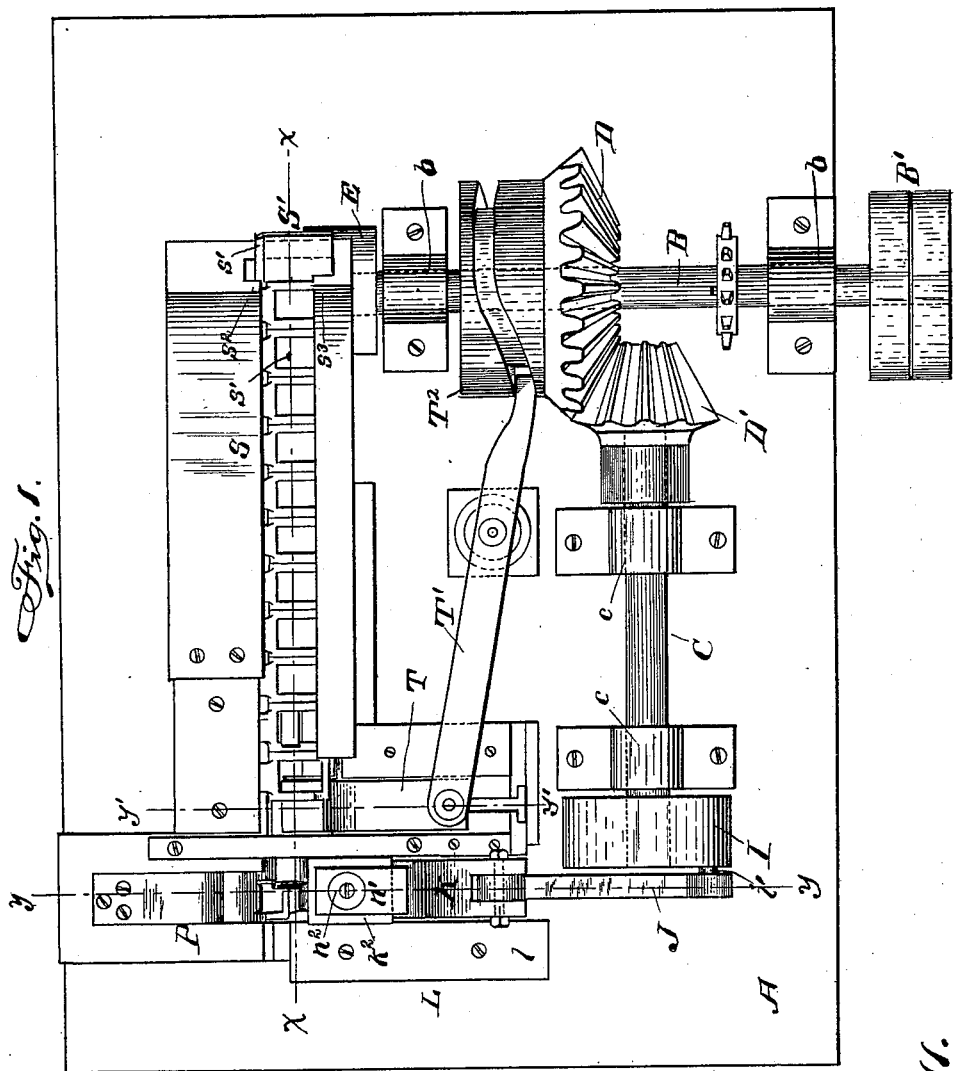
Figure 2:
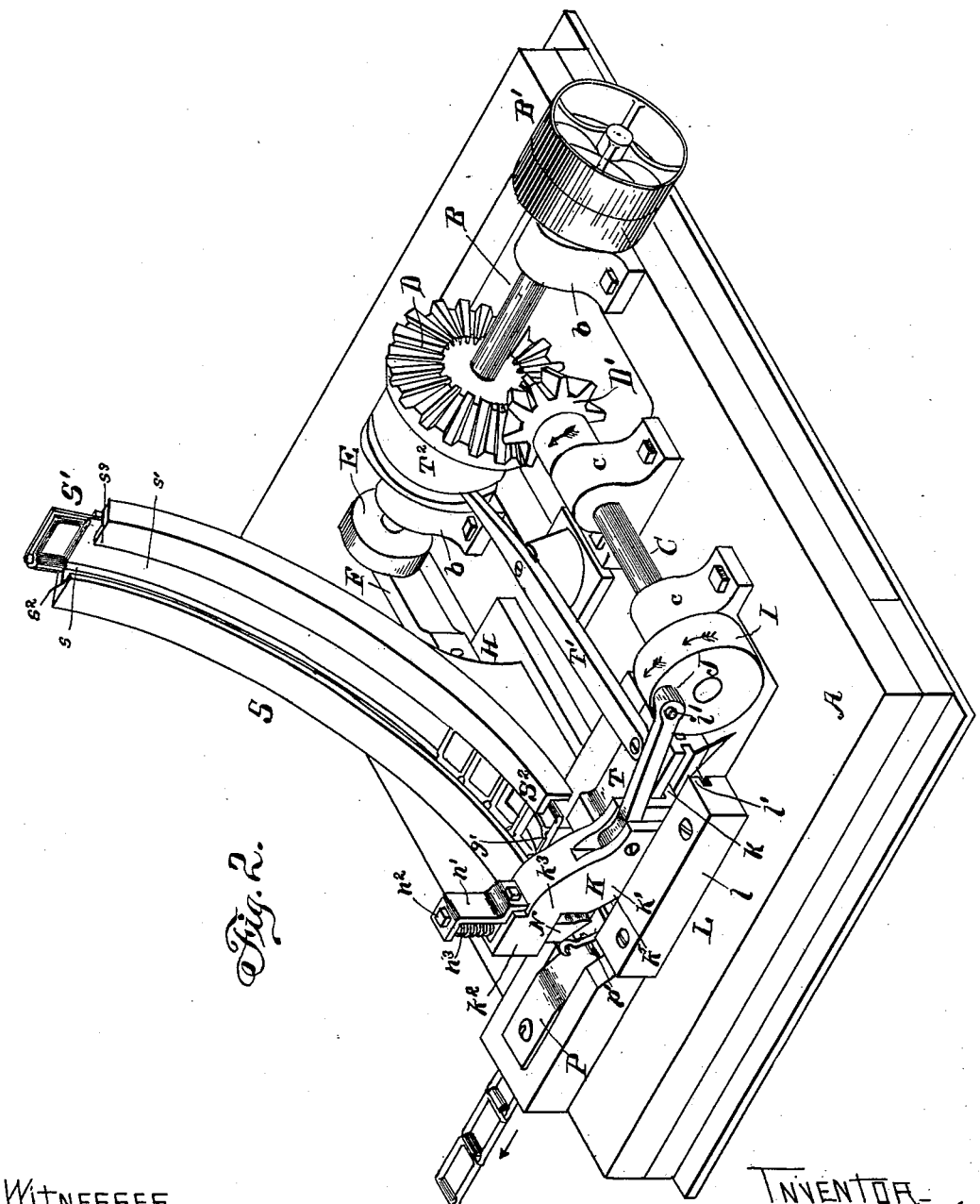

Figure 1 is a plan view of a machine embodying my improvements. Fig. 2 is a perspective view thereof. Fig. 3 is a section on the line $x\,x$ of Fig. 1. Fig. 4 is a section on the line $y\,y$ of Fig. 1. Figs. 5, 6, and 7 are elevations of the parts which perform the final coupling acts. Fig. 8 is a section on the line $z\,z$ of Fig. 3. Fig. 9 is a section on the line $x'\,x'$ of Fig. 4. Fig. 10 is a section on the line $y'\,y'$ of Fig. 1. Fig. 11 is a similar view with the pusher in another position. Fig. 12 is a section on the line $z'\,z'$ of Fig. 4. Fig. 13 is a section on the line $y^2\,y^2$ of Fig. 3. Fig. 14 is a plan view of the link-holding spring. Fig. 15 is a section of the same. Fig. 16 is a perspective, Fig. 17 a plan, and Fig. 18 an end view of the plunger which advances the loose links. Fig. 19 is an elevation showing part of said plunger, its pitman, and eccentric. Fig. 20 is a perspective of the pusher for finally placing the loose links in their proper angular position. Fig. 21 is a view showing the different positions of the links occupied from the time they are on the guideway to the time they are in their final coupled position. Fig. 22 is a perspective of part of the chain-guide.

In the drawings, A indicates a bed or base on which the operative parts are mounted. It may be of any suitable form and elevated from the floor by legs or uprights, as at $a\,a$.

B is a shaft mounted in bearings $b$, secured to the bed. As shown, this shaft B receives the power for the several parts from the belt-wheel B', secured to it.

C is a transversely-arranged shaft mounted in bearings at $c\,c$ and geared to the shaft B through the bevel-wheel D and pinion D', the latter being one-half the diameter of the wheel D, so that the shafts B and C will be speeded as one to two.

E is a crank-wheel secured to the shaft B, it having a slot at $e$, wherein is adjustably seated a wrist-pin $e'$. To the latter is hinged a pitman F, which in turn is pivoted to a slide or plunger G. This slide is formed with tongues $g$, which are held in a guideway H, provided by the bars $h$, having the flanges $h'$, which overlap the tongues $g$. This is shaped and related to the other parts in a peculiar manner, to be described. The shaft C is also provided with a crank-wheel I, having a slot $i$, in which is secured a wrist-pin $i'$. To this is hinged a pitman J, which is pivoted to a plunger K, having guide-tongues $k$, the plunger being placed in a guideway L, formed of bars $l$, with overhanging flanges $l'$. The plunger K is formed with the body part $k'$ and a head $k^2$, carried by an upwardly-extending neck $k^3$, the forward surface near the lower part being curved, as shown at $k^4$, and on the outer face there is a web or flange $k^5$, extending forward somewhat from this surface $k^4$. This rib or flange $k^5$ forms a stop, against which the outer side bar of the last-inserted link bears as it is moving down into the planes of the coupled links by the plunger K, and said stop acts to limit the movement of the newly-inserted link transversely of the last of the coupled links, which is held stationary by means to be hereinafter described. The bed is formed with a recess at M, adapted to receive a portion of the hook part of each of the links, as the latter successively are coupled to and become the last link of the chain. The head $k^2$ has a vertical passage-way, through which there is passed an arm N, the arm and its aperture being angular in section, so as to prevent rotation. It is prevented from dropping by means of a stem $n$, passing through a guide piece or head $n'$, extending up from the plunger K and having a head or cap plate $n^2$. The upper portion of the bar or arm N is reduced in size, so that there is formed thereon at an intermediate point of its length a horizontal laterally-projecting flange, which when the said bar is in its lowermost position lies flush with the upper surface of the head $K^2$ of the plunger. A spring $n^3$ is fitted around the reduced portion of the bar N between the guide $n'$ and the flange on the bar to permit the latter to rise, but normally holding it in its lowermost position. The downward-projecting part of the bar N has an inclined surface at $n^4$ and preferably a slight swell or expansion at $n^5$ on the opposite side.

By examining Figs. 4, 5, 6, and 7 it will be seen that if a link, as at O, has its end bar $o$ placed in the hook $o'$ of a similar link O', the latter being in the position indicated, the bar N will act to swing or rock the link O down into the position shown in dotted lines at $O^3$ or $O^4$, when said arm is next drawn by the crank-wheel I in the direction of the arrow 1. It will also be seen that when the plunger K is at the next step returned in the direction of the arrow 2 the inclined surface at $k^4$ will engage with the hook end of link O, if it should have stopped at $O^3$, and cause it to swing downward until it is in line with the links O' $O^2$ of the already-formed chain, and after it has thus got in line it will be thereby pushed longitudinally forward until the hook part of the link is seated in the aforesaid recess at M, or, in other words, until the link O occupies the position shown as being now occupied by the link O'. In order to hold the last coupled link down at the hook end and to keep it steadily in position, I employ a spring P, fastened at $p$ to any suitable support and curved or bent down and then rounded, as shown at $p'$, so that while tending to hold the links down in turn it offers no impediment to their moving longitudinally readily under it, and in order to prevent the links from slipping backward after their hooks are seated in the recess at M, I employ a spring-holder Q, preferably formed of a leaf-spring, having one end $q'$ secured to the bed-plate, and the other free end $q$ of which normally lies horizontally opposite to the axis of the hook, to which position it automatically moves after the hook has been pushed over it by the plunger K. The coupled chain O' $O^2$, &c., is passed endwise along a guideway at R.

In respect to the matters last described it will be seen that the machine differs entirely from those which effect the swinging of the newly-inserted link O by means of a stationary stop plate or bar placed in the angle between the two links, and which machines necessitate that the forward draft on the coupled chain should cause the rocking of the new link down into line. Many of the links are not either entirely clean within their hooks or around their end bars as they come from the molds and the annealing-furnace, and in some cases fins or webs of metal remain upon them, and in such instances more or less force is required to cause the rocking or swinging of the newly-inserted links, and if the force is applied, as in earlier machines, near the axis of articulation a strain and fracturing tendency is exerted much greater than with the machine herein, which applies the force with the longest possible leverage, resulting from the plunger K having two movements at each coupling action, one of which effects the swinging of the new link and the other of which advances it to the position for receiving the next one.

The links are fed and advanced to the position of that at O in the figures last above referred to as follows: S is a guideway, which consists mainly of a guide part $s$, adapted to engage with the hook part of the links, and means for holding the links in the desired position relative to this guide part. As shown, I employ a bottom plate $s'$ and support upon it the hook-guide $s$. Preferably the base $s'$ and the guide $s$ are formed from a single metal sheet. These parts are associated with flanges $s^2$ $s^3$, which can be formed by metal sheets or of other suitable material and connected with the part $s$ in any suitable manner. The flanges $s^2$ $s^3$ overhang the guide $s$ and opposite edge of the bottom plate $s'$, respectively, and do not extend the entire length of the said guide $s$ and its bottom plate. The flange $s^3$ is somewhat lower than that at $s^2$, it lying above the end bars of the links, while that at $s^2$ lies above the hooks. This flange $s^3$, it will be seen, prevents the operative from inverting the links as they are fed to the guideway—that is, from getting them in the wrong position endwise—and the flange $s^2$ prevents him from getting them in the wrong position with respect to their faces. At S' it will be seen that the flanges $s^2$ $s^3$ are omitted, so that the one feeding the machine can there insert the links successively, each being put in in such a way that the guide $s$ lies within the link-hook. The guide S as a whole is curved vertically to bring the links around into the proper position to be acted on by the above-described plunger or pusher G. This pusher is formed with a head having two operative parts, one at $g'$ and the other at the end $g^2$. As shown, the part $g^2$ is integral with the body part of the pusher and the part $g'$ has a limited movement, being preferably formed of a strip of spring metal secured to the body and having a downwardly-extending lug $g^5$. It can swing down, the pusher having a recess at $g^6$ in the body part to permit such motion. At $g^3$ and $g^4$ there are grooves adapted to fit more or less the side bars of the links. This pusher is under the guideway S, and the part $g'$ is adapted to project slightly up across the plane of the links as they successively approach to bring the lug $g^5$ into position to engage with and push each link, as shown in Fig. 3. At each forward movement the pusher G affects the positions of two links. The part $g'$ impinges on the side bar of a link at the bottom of the guideway and advances it the width of one link. When it reaches this position, it can swing downward, as diagrammatically illustrated in Fig. 21, to the position shown at $O^5$. (See also Fig. 11.) When in this latter position it is ready to be acted on by the part $g^2$ of the pusher and is at the angle relative to the link $O'$ (see Fig. 5) necessary to permit it to be pushed into the hook of link $O'$. In other words, at each forward movement of the pusher G the part $g^2$ pushes a link into the hook of the previously-advanced link and at the same time the part $g'$ pushes a link from the bottom of the guideway forward to a place where it can swing down to the coupling angle. It will be seen that the flanges $s^2 s^3$ are stopped at $S^2$, but that the hook-guide $s$ continues to the line at $S^4$, immediately adjacent to the side lines of the coupled chain, and the support for the hook-guide $s$ is differently placed as to horizontal lines—that is, is bent or inclined at an angle such as is shown at $s^4$ in Figs. 10 and 11, this commencing at the line where the plunger engages with the side of the link, so that the end bar of the latter can drop from the upper position to the lower. (Shown in Figs. 10 and 11.)

To insure that the link shall swing from the horizontal position, as in Fig. 21, to the coupling angle and to hold it at the latter angle while being advanced, use may be made of a supplemental pusher T. It is moved back and forth by a lever T' and a cam $T^2$. It moves back far enough to let the links successively swing down in front of it, as shown in Fig. 11, and then moves up to the position shown in Fig. 10, where it lies close to but does not press against the link and permits the part $g^2$ of the pusher G to move behind it and advance the link in the manner illustrated in Fig. 3.

The method of operating the above-described mechanism will be readily understood. When the parts are in motion, the links are successively fed to the chute or guideway S by placing them with their hooks on the guide $s$ at $S'$, from which place they slide in series downward. One after another is caught by the pusher G and advanced a distance equal to the width of the link. When the pusher draws back from below it, the link drops to the lower position in Figs. 10 and 11. At the next advance of the pusher it engages with the side of the link and drives its end bar transversely through the hook $o'$ of the previously-fed link, its own hook passing from the guide $s$ into the space between the arm N and the head K, the movement being so timed that the head K is in the position shown in Fig. 7 at the time the link is inserted; but instantly thereafter the head K moves forward to the position shown in Fig. 5 and then draws backward and the arm N rocks the link down toward the working-line, as illustrated in Figs. 6 and 7, and as the plunger K makes two strokes to one of the plunger G the link is rocked down and shoved forward by the surface $k^4$ before another link has been brought forward by the plunger G. As the plunger K moves from the position shown in Fig. 2 to that shown in Fig. 5 the inclined surface $n^4$ of the arm N impinges upon the rounded side of the link-hook and the arm is readily pushed up to permit it to pass the hook and reach the position in Fig. 5, the spring $n^3$ acting to return it to its lower position. Thus it will be seen that the arm N has two possible motions, one being its motion of carriage with the head or plunger K and the other being its longitudinal movement caused by the cam-like action of the link-hook and the cam-surface at $n^4$.

Inasmuch as the forward feeding of the coupled links is dependent on the motion of the plunger K and is dependent upon the presence of a link in its path, there will be no movement of the chain or coupled links if for any reason a link fails to be advanced by the feeding-plunger G. In other machines requiring, as aforesaid, draft on the coupled chain in order to rock down the last link the chain movement takes place at regular intervals, and in case the feeding devices should fail to introduce a link at any time the link last previously inserted will be advanced so that its hook will not be in position for the end bar of another link; but this is obviated with the machine herein shown and described, for when the feeding devices fail to act the plunger K and arm N though continuing to move back and forth produce no effect upon the chain.

What I claim is—

1. In a link-coupling machine, the combination with the means for holding a link with its hook in a predetermined position where it is adapted to have the end bar of another link inserted therein, of a positively-acting mechanism for engaging with the free portions of and rocking the newly-inserted link toward the line occupied when in working position, substantially as set forth.

2. In a machine for coupling chain-links, the combination with devices for holding a link in a predetermined position to have its hook situated to receive the end bar of another link, of a bar movable across the lines of the first link and engaging with the newly-inserted link at or near its hook end, to rock it on its end bar, substantially as set forth.

3. The combination with the means for holding a chain-link in a predetermined position to have its hook situated to receive the end bar of another link, of means movable in relation to the said links and adapted to engage with the one newly inserted to rock it toward its working line, and means supplemental thereto engaging with the hook of the said newly-inserted link and adapted to push it endwise, substantially as set forth.

4. In a machine for coupling chain-links, a mechanism for holding a link in a predetermined position having a movable stop situated to engage with the outer face of the hook, to assist in holding the link stationary and in position to be engaged by another link, substantially as set forth.

5. In a machine for coupling chain-links, the combination with the means for moving a link to a predetermined position to have its hook situated to receive the end bar of another link, of a spring-actuated presser bearing downward on the face of the link, substantially as set forth.

6. In a machine for coupling chain-links, a holder for a link having a recess as at M for the hook of the link, a movable stop for the outside of the hook, and a spring-presser for holding the hook in the said recess, substantially as set forth.

7. In a machine for coupling chain-links, the combination with the link-holding devices adapted to retain each link in a predetermined position to receive within its hook the end bar of another link, of the plunger having inclined surface at $k^4$ for engaging the end of the link, and the arm N for engaging with and rocking the link, substantially as set forth.

8. The combination with the link-holding devices for retaining each link in the predetermined position, of the bar or arm N movably supported on a moving holder and adapted to engage with the chain-links to rock them on their end bars, substantially as set forth.

9. The combination with the means for holding the links adapted to retain each in a predetermined position to receive the end bar of an adjacent link, of the plunger K having a stop $k^5$ adapted to move to and from the axis of the hook and end bar in a plane at one side of the stationary link, substantially as set forth.

10. The combination with the means for retaining a link in a predetermined position to have its hook receive the end bar of another link, of a reciprocating stop movable toward and from said end bar and adapted to limit its movement transversely of the stationary link, substantially as set forth.

11. In a machine for coupling chain-links, the combination with the holding devices for retaining each link successively in a predetermined position adjacent to the coupling devices, of means for guiding the links to the coupling devices having a guide adapted to enter and engage with the interior of the hooks successively, substantially as set forth.

12. The combination with the means for holding each link in succession in a predetermined position to have its hook receive the end bar of another link at a predetermined angle to the aforesaid link, of a guide for a series of links adapted to engage with the interior of their hooks and to deliver them to the links to which they are to be coupled in a position at the aforesaid angle, substantially as set forth.

13. The combination with the retaining devices for holding each link in a predetermined position to have its hook receive the end bar of another link, of a guide for the last-said link having the part s within the interior of the hook of the link, and the flange $s^2$ arranged as described to prevent the inversion sidewise of the link, substantially as set forth.

14. In a machine for coupling chain-links, the combination with the means for holding each link in position to have its hook receive the end bar of another link, of a guide for the loose links having the flange or wall $s^3$, and an opposing wall between which move the end bars of the links, and the distance between which walls is less than the diameter of the hooks, substantially as set forth.

15. In a machine for coupling chain-links, the combination with the guide for the loose chain-links having a holder adapted to engage with the interior of the hooks of the loose links, of the holder $s'$ for the side bars of the links, and a holder $s^4$ for said side bars arranged to permit them to rock into another position relative to that occupied when retained by the holder $s'$, substantially as set forth.

16. In a machine for coupling chain-links, the combination with the devices which retain each link in succession in position to have its hook receive the end bar of another link, and a guideway for the loose links, of the plunger adapted to engage directly with each link twice when feeding it forward, substantially as set forth.

17. The combination with the loose-link guide, and the coupled-chain holder, of the plunger having two link-engaging parts on different transverse planes, substantially as set forth.

18. The combination with the reciprocating plunger for moving the links transversely of the chain of coupled links, of the reciprocating plunger for advancing the coupled links, and means for imparting two reciprocations to the last-said plunger while the first plunger aforesaid is reciprocating once, substantially as set forth.

19. In a machine for coupling chain-links the combination with means for holding a link stationary in position to have its hook receive the end bar of another link, of a pusher arranged to move toward and from the newly-coupled link in the direction of the length of the chain, and having an arm arranged to move at right angles to said pusher and engage with the free portion of the newly-inserted link, substantially as set forth.

20. In a machine for coupling chain-links, the combination with means for holding the last-coupled link of a chain in position to have its hook receive the end bar of another link, of a reciprocating pusher, K, arranged to move the chain longitudinally, and an independently-movable arm carried by said pusher and arranged to engage with the newly-inserted link and rock the same about its end bar into the path of said pusher, substantially as set forth.

21. In a machine for coupling chain-links, the combination with means for holding the last link of a chain stationary, and means for causing the end bar of another link to enter the hook of said engaged link, of a reciprocating pusher, and a spring-pressed bar, N, arranged to engage with the newly-inserted link and rock the same about its end bar into position to have its hook engaged by the reciprocating pusher and advanced to a position to be engaged by the first-said holding or engaging means, substantially as set forth.

22. In a chain-coupling machine, the combination of a guideway or support for loose links, means for holding a link stationary with its hook in line with said guide, a reciprocating plunger arranged to positively engage simultaneously with two of the loose links on said guide and cause the end bar of one to enter the hook in said stationary link, means for engaging with the hook end of the newly-inserted link and rocking it about its end bar, and another plunger adapted to move both of the engaged links endwise to bring the hook of the last-coupled link into line with the guide for loose links, substantially as set forth.

23. In a machine for coupling chain-links, the combination of means for holding a link in a horizontal position, a guide for loose links having a portion, $S^4$, adapted to hold a link vertical, and with its end bar in line with the hook of the first-said link, and a series of links in a position more or less approximately horizontal, a plunger arranged below and in line with said guide, and adapted to engage with a side bar of a link on the portion $S^4$ of the guide to force the end bar of a link on said portion of the guide into the hook of the horizontally-arranged link, a supplemental plunger, $g'$ adapted to push a link onto said portion, $S^4$, of the guide, means for rocking the newly-coupled link about its end bar into a horizontal position, and means for pushing the coupled links longitudinally, substantially as set forth.

24. In a machine for coupling together chain-links having hooks and end bars adapted to enter and articulate within the said hooks, the combination of coupling devices, and a guideway for supporting the links on their faces with their edges arranged crosswise of the guideway, and having an approximately horizontal part and a more nearly vertical part communicating with the horizontal part whereby the links can be carried edgewise from a more nearly vertical position to points near the coupling devices where they are in a more nearly horizontal position, substantially as set forth.

25. In a chain-coupling machine, the combination with the coupling devices, of a guide adjacent to the coupling devices and engaging with the interior of the hooks to hold said hooks in an approximately horizontal position, and a feeding-guideway wherein the links are held upon their faces and arranged to deliver the links to the guide near the coupling devices which engages with the interiors of the hooks, substantially as set forth.

26. In a chain-coupling machine, the combination with the chain-holder, of the initial feeding link-guide arranged substantially as set forth, to guide the links sidewise toward the vertical planes of the chain-holder, and a pushing device for coupling each link in turn sidewise with the chain.

27. In a chain-coupling mechanism, the combination with the chain-holder, of the initial link-guide extending from vertical planes remote from the vertical planes of the chain-holder toward the last-said vertical planes, and adapted to have the links passed therethrough on lines transverse to their side bars, and the pusher for coupling the links successively sidewise with the chain, substantially as set forth.

28. In a link-coupling machine, the combination of the chain-holder, and a loose-link guide arranged to guide the links therethrough edgewise and extending from relatively higher to relatively lower planes, and disposing the links in said relatively lower planes in an approximately horizontal position above the planes of the chain, and means for carrying the links successively from said higher horizontal position into a position of engagement with the chain, substantially as set forth.

29. In a link-coupling machine, the combination with the link-coupling devices and the chain-holder, of an initial guideway arranged to feed the links sidewise toward the vertical planes of the chain, and dispose them in a position relatively horizontal, and thereafter transfer them to a position inclined to the horizontal and immediately adjacent to the chain, substantially as set forth.

30. In a chain-coupling machine, the combination of a chain-holder, a loose-link holder immediately adjacent to the side of the chain, means for positively pushing against the face of the loose link to bring it to the proper position by the side of the chain, and means for pushing the link edgewise into the position of coupling with the chain, substantially as set forth.

31. In a machine for coupling chain-links, the combination with the coupling devices and the chain-holder, of the guide for the loose links adapted to deliver links to a position immediately adjacent to the side of the chain, and automatically-operated means for pressing transversely or facewise against each loose link in turn to force it to a predetermined position for coupling, substantially as set forth.

32. In a machine for coupling chain-links, the combination with the coupling devices and the chain-holder, of means for holding each loose link in turn at the proper angle to the line of the chain, intermittingly-acting devices for pushing each link edgewise across the lines of the chain, and intermittingly-acting devices for pushing each link facewise to the proper angle relatively to the lines of the chain, substantially as set forth.

33. In a chain-coupling machine, the combination of the coupling devices and the chain-holder, of a holder for each loose link in turn, sustaining it in position at the proper angle relatively to the lines of the chain, means for swinging each loose link about an axis to bring it into the said proper angle, and means for carrying the link across the lines of the chain, substantially as set forth.

34. In a machine for coupling chain-links, the combination of a chain-holder, a holder for each loose link in turn at points immediately adjacent to the chain to retain them in the proper angle relatively to the line of the chain for coupling therewith, a guideway which delivers the loose links in turn to a position at another angle to the lines of the chain, and a movable link-support adapted to be disengaged from the links successively to permit them to be moved from the last to the first aforesaid angle, substantially as described.

35. The combination with the chain-holder, and the holder immediately adjacent to the side of the chain for the loose links and sustaining them successively at a predetermined angle to the lines of the chain, a link-support initially holding each link at another angle to the chain, and a link-pushing device adapted to force the links in turn from the last-said position to that of the aforesaid predetermined angle to the chain, substantially as set forth.

36. The combination with the chain-holder, of the link-pushing device moving in lines parallel to and at the side of the chain, and the link-pushing device moving in lines transverse to the lines of the chain, substantially as set forth.

37. The combination with the chain-holder, and the means for automatically advancing the chain step by step, of the guide for the loose links having its longitudinal lines in planes at right angles to the planes of the chain and having a guideway adapted to carry the links sidewise toward the chain, and a link-pushing device moving on lines at the side of and parallel to the lines of the chain, and the coupling devices, substantially as set forth.

38. In a chain-coupling machine, the combination of a chain-guide, a guide for loose links, means for pushing the end bars of each loose link in turn into the hook of the last link of the chain, means for turning each link relatively to the lines of the chain from the coupling position to the working position, and chain-advancing mechanism engaging with the last-coupled link of the chain to feed it longitudinally, substantially as set forth.

39. In a chain-coupling machine, the combination of a holder for the last link of the coupled chain, a loose-link guide arranged with its delivery end adjacent to the side of the said holders and at right angles thereto, and means for forcing a link from the link-guide and coupling it to the last link of the chain, substantially as set forth.

In testimony whereof I affix my signature in presence of two witnesses.

WILLIAM W. WILLSON.

Witnesses:
R. MOOS. HUTCHINS,
CHARLES W. MILLER.